(12) United States Patent
Turkoglu (10) Patent No.: US 7,554,925 B2
(45) Date of Patent: *Jun. 30, 2009

(54) METHOD AND SYSTEM FOR CREATING A QUALITY OF SERVICE MESSAGE

(75) Inventor: Ali Ediz Turkoglu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/230,449

(22) Filed: Sep. 20, 2005

(65) Prior Publication Data

US 2006/0036749 A1 Feb. 16, 2006

Related U.S. Application Data

(63) Continuation of application No. 11/078,968, filed on Mar. 9, 2005, now Pat. No. 7,302,682, and a continuation of application No. 09/546,726, filed on Apr. 11, 2000, now Pat. No. 6,941,551.

(51) Int. Cl.
G01R 31/08 (2006.01)
(52) U.S. Cl. .................. 370/242; 370/248; 370/395.21
(58) Field of Classification Search ........................ None
See application file for complete search history.

(56) References Cited

U.S. PATENT DOCUMENTS

| 5,414,812 | A | | 5/1995 | Filip et al. |
|---|---|---|---|---|
| 5,831,975 | A | | 11/1998 | Chen et al. |
| 5,909,368 | A | * | 6/1999 | Nixon et al. .................. 700/2 |
| 6,021,263 | A | | 2/2000 | Kujoory et al. |
| 6,032,208 | A | * | 2/2000 | Nixon et al. .................. 710/64 |
| 6,269,330 | B1 | * | 7/2001 | Cidon et al. .................. 714/43 |
| 6,502,131 | B1 | | 12/2002 | Vaid et al. |
| 6,516,350 | B1 | | 2/2003 | Lumelsky et al. |
| 6,567,846 | B1 | * | 5/2003 | Garg et al. .................. 709/218 |
| 6,578,076 | B1 | | 6/2003 | Putzolu |
| 6,590,885 | B1 | | 7/2003 | Jorgensen |

(Continued)

OTHER PUBLICATIONS

*Quality of Service Technical White Paper*, White Paper, Microsoft Corporation, 1999.

(Continued)

*Primary Examiner*—Hong Cho
*Assistant Examiner*—Anthony Sol (57) ABSTRACT

A test program creates a variety of types of quality of service messages to allow a user to test the response of one or more network devices to the variety of messages. The test program displays a representation of a quality of service message on a user interface. The representation may be implemented as a tree having a branch for each section of the quality of service message. Each branch may be expanded to reveal one or more values of one or more parameters stored in the represented section. By entering a value on the user interface, the user can change the value of a parameter in represented message. The test program also allows a user to intentionally create an invalid quality of service message, such as by inserting an invalid value into one or more fields, deleting one or more required values, adding one or more invalid sections, or by deleting one or more required sections. The test program also automatically creates one or more invalid sections at the request of the user.

13 Claims, 12 Drawing Sheets

U.S. PATENT DOCUMENTS

| | | |
|---|---|---|
| 6,606,744 B1 * | 8/2003 | Mikurak ............... 717/174 |
| 6,618,389 B2 | 9/2003 | Hoefelmeyer et al. |
| 6,625,150 B1 | 9/2003 | Yu |
| 6,674,725 B2 * | 1/2004 | Nabkel et al. ............ 370/252 |
| 6,862,622 B2 | 3/2005 | Jorgensen |
| 2002/0099854 A1 | 7/2002 | Jorgensen |

OTHER PUBLICATIONS

Braden, R. et al., *Resource ReSerVation Protocol (RSVP). Version 1 Functional Specification*, RCF 2205, Sep. 1997, Available from www.ietf.org/rfc/rfc2205.txt [accessed Jan. 17, 2000].

Wroclawski, J., *The Use of RSVP with IETF Integrated Services*, RFC 2210, Sep. 1997, Available from www.ietf.org/rfc/rfc2210.txt [accessed Jan. 17, 2000].

Yavatkar R. et al., *SBM (Subnet Bandwidth Manager): A Protocol for RSVP-based Admission Control Over IEEE 802-Style Networks*, Internet Draft, Oct. 1999, Available from http://search.ieft.org/internet-drafts/draft-ietf-issll-is802-sbm-09.txt [accessed Jan. 14, 2000].

Quality of Service Technical White Paper, White Paper, Microsoft Corporation, 1999 ( The corresponding document was previously submitted in connection with U.S. Appl. Nos. 09/546,726 and 11/078,968 and is not being resubmitted herewith per 37 CFR 1.98(d).).

Braden, R. et al., Resource ReSerVation Protocol (RSVP), Version 1 Functional Specification, RCF 2205, Sep. 1997, Available from www.ietf.org/rfc/rfc2205.txt [accessed Jan. 17, 2000] (The corresponding document was previously submitted in connection with U.S. Appl. Nos. 09/546,726 and 11/078,968 and is not being resubmitted herewith per 37 CFR 1.98(d).).

Wroclawski, J., The Use of RSVP with IETF Integrated Services, RFC 2210, Sep. 1997, Available from www.ietf.org/rfc/rfc2210.txt [accessed Jan. 17, 2000] (The corresponding document was previously submitted in connection with U.S. Appl. Nos. 09/546,726 and 11/078,968 and is not being resubmitted herewith per 37 CFR 1.98(d).).

Yavatkar R. et al., SBM (Subnet Bandwidth Manager): A Protocol for RSVP - based Admission Control Over IEEE 802-Style Networks, Internet Draft, Oct. 1999, Available from http://search.ieft.org/internet-drafts/draft-ieft-issll-is802-sbm-09.txt [accessed Jan. 14, 2000] (The corresponding document was previously submitted in connection with U.S. Appl. Nos. 09/546,726 and 11/078,968 and is not being resubmitted herewith per 37 CFR 1.98(d).).

"Applicants point out that for any reference listed in this IDS, should a year of publication be listed without a month, that the year of publication is sufficiently earlier than the effective U.S. filing date and any foreign priority date so that the particular month of publication is not in issue (see MPEP 609.04(a)).".

* cited by examiner

METHOD AND SYSTEM FOR CREATING A QUALITY OF SERVICE MESSAGE

CROSS REFRENCE TO RELATED APPLICATION(S)

This application is a continuation of U.S. patent application Ser. No. 11/078,968, filed Mar. 28, 2005, which is a continuation of U.S. patent application Ser. No. 09/546,726, filed Apr. 11, 2000.

FIELD OF THE INVENTION

The invention relates generally to the creation of quality of service messages and, more particularly, to a method and system for creating a variety of types of quality of service messages to test one or more network devices.

BACKGROUND

Quality of service (QOS) technology enables a networking device, such as a router, switch, server, workstation, gateway, or personal computer to reserve bandwidth on a network in order to ensure that an appropriately configured pathway is created between it and one or more remote senders on the network. An example of a protocol that is frequently used in creation of QOS messages is the reservation protocol, or RSVP. When attempting to send data over a network, a sending device using RSVP transmits a path message along the intended route. The recipient device respond by transmitting a reservation message back along the route. The reservation message contains information as to the bandwidth and reliability of service required by the recipient device for receipt of the data. The devices along the intended path may then respond by informing the recipient device whether the requesting networking resources are available. RSVP may be extended to provide policy control for traffic on a local area network (LAN) through the placement of a designated subnet bandwidth manager (DSBM) at various segments of the LAN. A DSBM communicates with other network devices using the subnet bandwidth SBM protocol as an extension to the RSVP protocol.

Like any network communication, QOS messages sometimes contain errors or are otherwise invalid. An invalid or unexpected QOS message usually causes one or more of the devices along its path to create an error message and send the error message back to the originator. Sometimes, however, an invalid or unexpected QOS message causes one or more devices along its path to drop the message, enter an invalid state, or crash completely. Thus, to adequately test the ability of a network device to handle an invalid QOS message, it is desirable to subject the device to a wide variety of message types and formats, including invalid messages. Currently, systems that create QOS messages are only capable of creating a small portion of the total range of QOS message formats that are available, and are not designed to intentionally create invalid messages. Furthermore, current systems do not allow a user, such as a test engineer, to interact with a user interface that allows each QOS message to be customized. These limitations make it very difficult to subject a network to the full range of QOS message formats and invalid conditions for testing purposes. Thus, it can be seen that there is a need for a novel method and system for creating a quality of service message.

SUMMARY OF THE INVENTION

In accordance with this need, a novel method and system for creating a quality of service (QOS) message is generally realized as a test program. The test program can create a variety of types of QOS messages and allow a user, such as a test engineer, to test the response of one or more network devices. The user interface of the test program displays a representation of the QOS message along with representations of the constituent sections of the message to a user. For example, the message may be represented by a tree and each section of the message may be represented by a branch of the tree. By manipulating the displayed representation, the user can change the value of a QOS parameter, add or delete a section or otherwise affect the content of the QOS message.

The test program also allows a user to intentionally create an invalid QOS message, such as by inserting an invalid value into one or more fields of the message, deleting the contents of one or more required fields, adding one or more invalid sections, or by deleting one or more required sections.

Once the user has customized a message, the message can be saved to memory for subsequent transmission to a network. By repeatedly creating and saving messages, the user can build a list of several messages. The list may include any desired mix of valid and invalid messages. The test program may then transmit the messages on the list at the rate specified by the user.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENT

Figure 1:
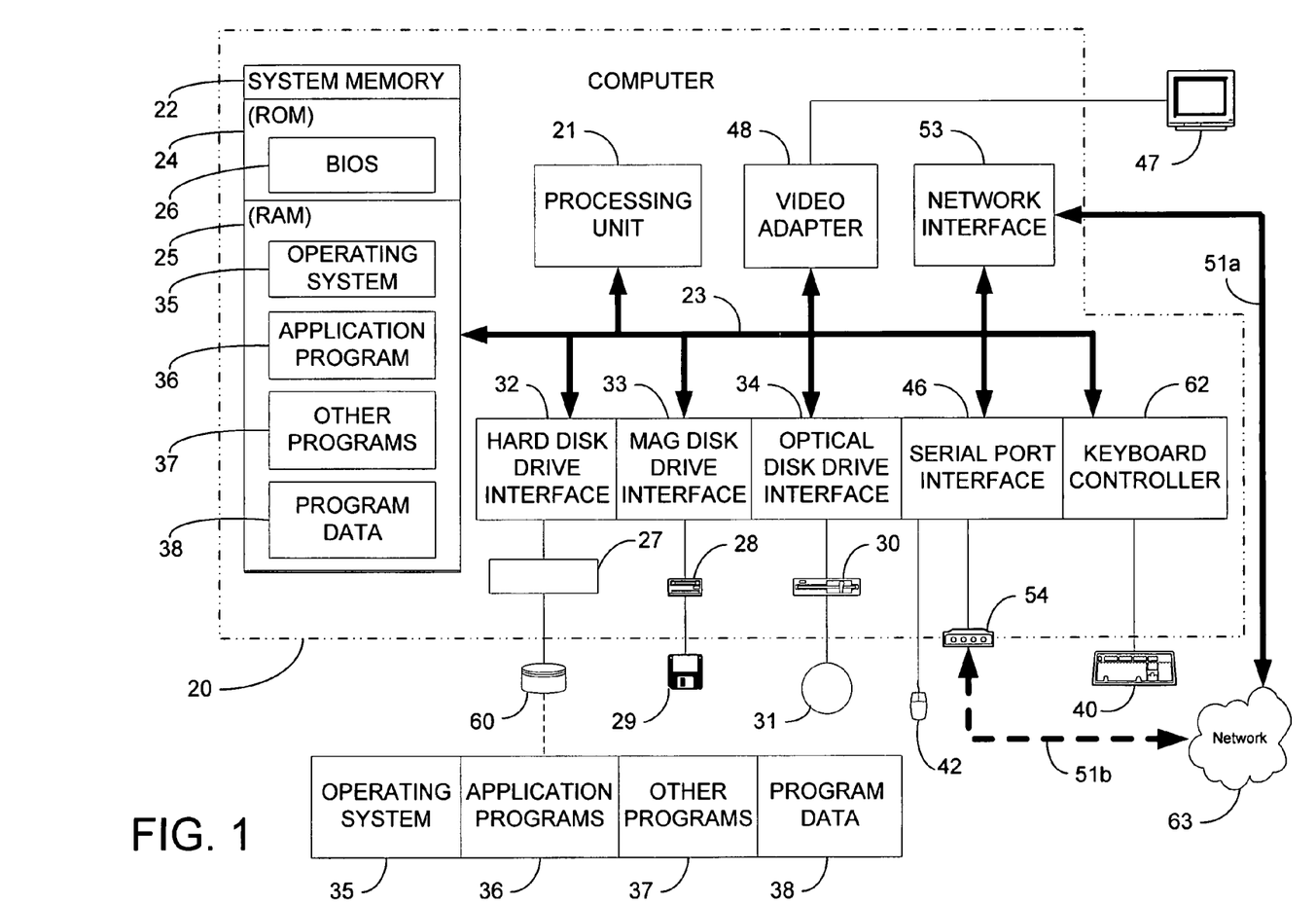
FIG. 1 is a block diagram generally illustrating an exemplary computer environment in which the present invention may be used.

Turning to the drawings, wherein like reference numerals refer to like elements, an exemplary environment for implementing the invention is shown in FIG. 1. The environment includes a general purpose-computer 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in the ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computers typically include other peripheral output devices, not shown, such as speakers and printers.

The computer 20 may operate in a networked environment using logical connections to one or more devices within a network 63, including another computer, a server, a network PC, a peer device or other network node. These devices typically include many or all of the elements described above relative to the computer 20. The logical connections depicted in FIG. 1 include a network link 51*a* originating at the network interface 53, and a network link 51*b* originating at the modem 54. Network links are commonplace in offices, enterprise-wide computer networks, intranets and the Internet and include such implementations as a local area network (LAN) and a wide area network (WAN). The physical media used for network links includes coaxial cable, twisted copper pairs, fiber optics, wireless communication, and the like. Data may transmitted over the network links 51*a* or 51*b* according to a variety of well-known transport standards, including Ethernet, SONET, DSL, T-1, and the like. When used in a LAN, the computer 20 is connected to the network 63 through a network interface card or adapter 53. When used in a WAN, the computer 20 typically includes a modem 54 or other means for establishing communications over the network link 51*b*, as shown by the dashed line. The modem 54, which may be internal or external, is connected to the system bus 23 via the serial port interface 46. In a networked environment, programs depicted relative to the computer 20, or portions thereof, may be stored on other devices within the network 63.

Those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will be made to one or more programs executing on a computer system or being executed by parts of a CPU. A "program" is any instruction or set of instructions that can execute on a computer, including a process, procedure, function, executable code, dynamic-linked library (DLL), applet, native instruction, module, thread, or the like. A program may also include a commercial software application or product, which may itself include several programs. Reference will also be made to one or more "objects" performing functions on a computer. An "object" is a programming unit used in many modem programming language. Objects may also execute on a computer as part of a process, procedure, and may be manifested as executable code, a DLL, an applet, native instruction, module, thread, or the like. However, while the invention is being described in the context of software, it is not meant to be limiting as those of skill in the art will appreciate that various of the acts and operation described hereinafter may also be implemented in hardware.

Figure 2:
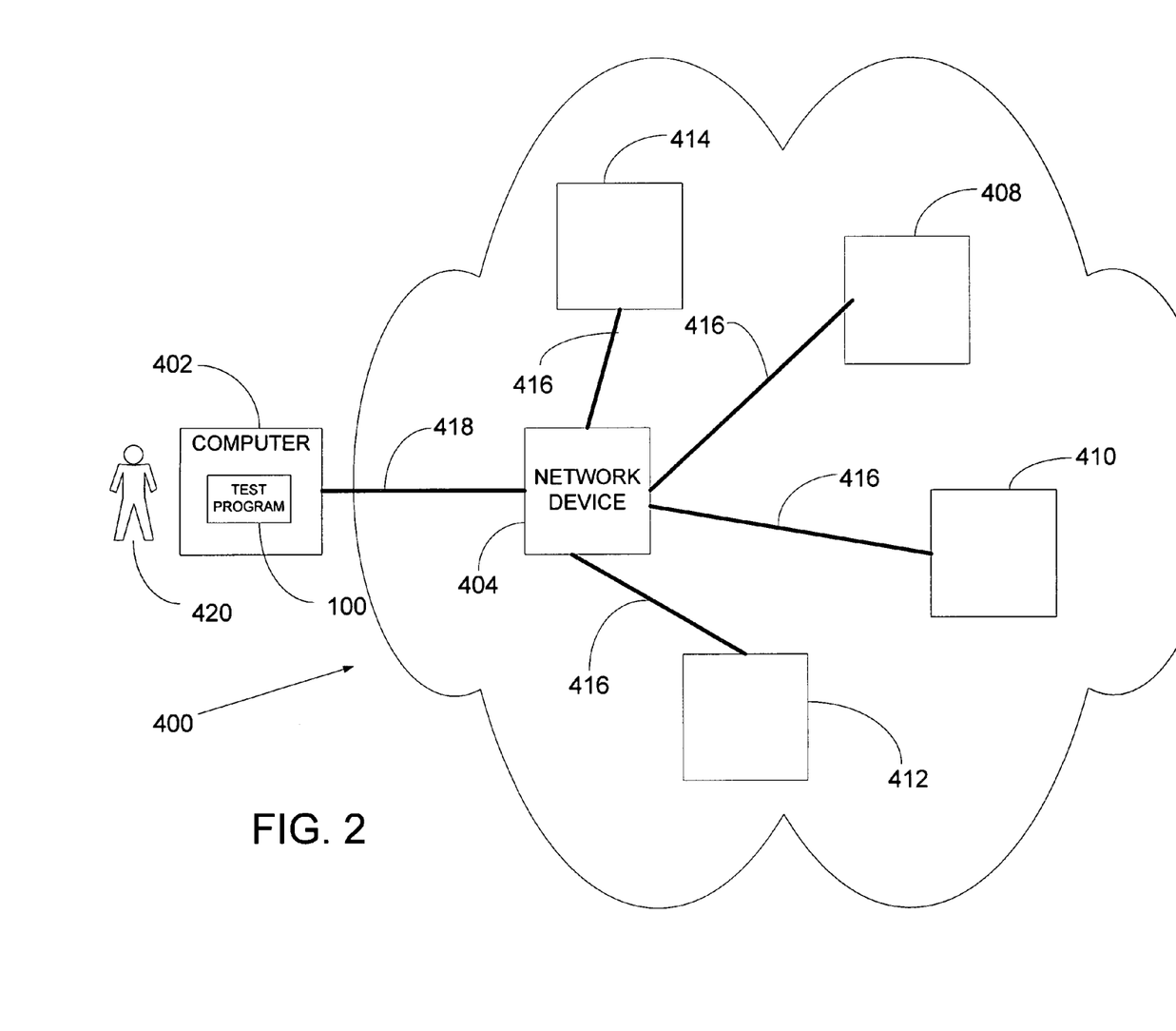
FIG. 2 is a block diagram generally illustrating how the present invention may be used to test one or more networking devices.

The method and system for creating a QOS message is generally realized in a test program that displays a representation of the message to a user and allows the user to add to or delete from the message by manipulating the representation. Turning now to FIG. 2, an example of how the test program may employed to test one or more networking devices is shown. The test program, labeled 100, is executed on a computer 402 that is communicatively linked to a network 400 by a network link 418. The network 400 includes network devices 404-414 that are communicatively linked by network links 416. The network links 416 and 418 may be implemented as described above with respect to the network links 51*a* and 51*b* above (FIG. 1). Possible implementations of the network devices 404-414 include, but are not limited to, routers, switches, gateways, servers, workstations, and personal computers. To test one or more of the network devices 404-414, the test program 100 creates a variety of types of QOS messages as specified by a user 122 and transmits them to the network 400. This variety may include one or more invalid QOS messages.

Each QOS message created by the test program 100 contains one or more sections. In the RSVP nomenclature, each section is called an "object." However, the term "section" will be used in lieu of "object" to avoid confusion with the description of the C++ objects used in the object-oriented architecture of a preferred embodiment of the test program. The quantity and format of the sections included in the QOS messages created depends on the version of the QOS protocol being used and the type of QOS message being created.

Each section of a created QOS message serves a particular purpose and contains values for one or more QOS parameters for accomplishing that purpose. The types of sections that are required to be included in a QOS message depend on the type of message itself. For example, the Resource Reservation Protocol (RSVP) Version 1 Functional specification published by the University of Michigan in September 1997 and incorporated by reference herein its entirety, mandates that every RSVP reservation message have a header section, a "SESSION" section, an "RSVP_HOP" section, a "TIME_VALUES" section, and a "STYLE" section. Each SESSION section includes the following parameters: a 32-bit header, a destination address, a protocol ID, a set of flags, and a destination port. The value assigned to a parameter is placed into a field associated with the parameter in the appropriate section. The types of values that may be assigned to a parameter include alphanumeric characters, numbers, or NULL values.

To allow a user to customize a QOS message, the test program 100 displays a representation of the QOS message, such as a graphical representation, that the user can manipulate and edit and control the content of the QOS message thereby. The message representation may be implemented as, for example, a set of cascading tiles, a series of fields, a list, or a table. The test program 100 also displays a representation for each section of the QOS message. The section representations may also be implemented in a number of ways, but are preferably subordinate to the message representation. For example, if the message representation is a table or list, then each section of the message may be represented as a column in the table or field in the list. If the message representation is a set of fields or a set of tiles, for example, then each section may be represented by one of the fields or one of the tiles The test program preferably displays the current parameter values contained within the section as well. To edit one or more of the current parameter values, the user activates an editing interface. Each edited parameter value is inserted into the field associated with the parameter in the created QOS message.

Figure 3:
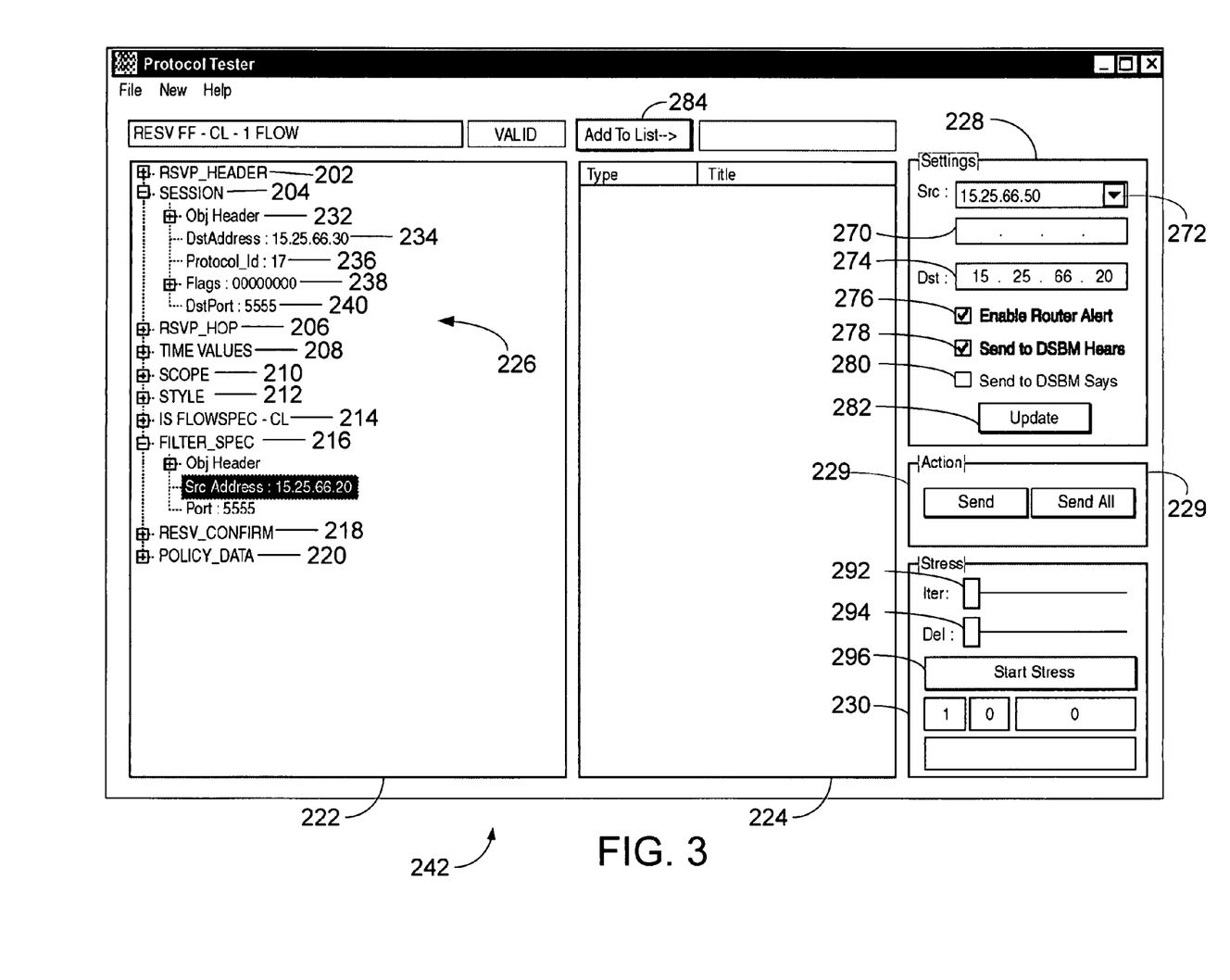
FIGS. 3-10 illustrate an exemplary graphical user interface for the present invention.

Turning now to FIG. 3, an exemplary embodiment of a graphical user interface (GUI) that allows a user to customize a QOS message on the test program is shown. A GUI 242 is divided into a message section 222, a list section 224, a settings panel 228, an action panel 229, and a stress panel 230. The settings panel 228 includes controls 270, 272, 274, 276, 278, 280 and 282 that allow a user to provide the initial settings for the QOS message. It is understood that the exact arrangement and function of the GUI 242 may be altered and may also depend on the QOS protocol.

A message tree 226 provides the user with a representation of a QOS message. The message tree 226 has a set of branches 202, 204, 206, 208, 210, 212, 214, 216, 218 and 220, in which each branch represents a section of the message. A user may expand a branch by clicking on the "+" sign next to the branch or collapse a branch by clicking on the "−" sign. Each branch may also have one or more sub-branches. A sub-branch represents one or more parameters of the section, and may also contain the current value of the parameter. Each sub-branch may also have further sub-branches to represent certain parts of the parameter value. For example, the message represented by the message tree 226 has a SESSION section represented by the branch 204. The branch 204 has sub-branches 232-240, which represent the object header, destination address, protocol Id, flags, and destination port parameters of the SESSION section of the message. The flags sub-branch 238 contains the current value of the "flags" parameter—00000000— and is further expandable to allow the user to manipulate individual bits within the "flags" parameter value.

To initially set up a QOS message, the user manipulates one or more controls on the settings panel 228. For example, the user may enter the source IP address in an entry field 270 and a destination IP address in an entry field 274. The user selects an existing source IP address from a pull down list by clicking on an arrow button 272. If the user wishes to have an optional router alert field inserted into IP header of the DOS message, he may check the box 276. When using the SBM extension to RSVP, the user may cause the generated RSVP message to be sent to the well-known multicast AllSBM Address (244.0.0.17) or to the well known multicast DSBMLogicalAddress (244.0.0.16) by checking the boxes 280 and 278 respectively. The user finalizes the settings of the settings panel 228 by activating the "Update" button 282.

Figure 4:
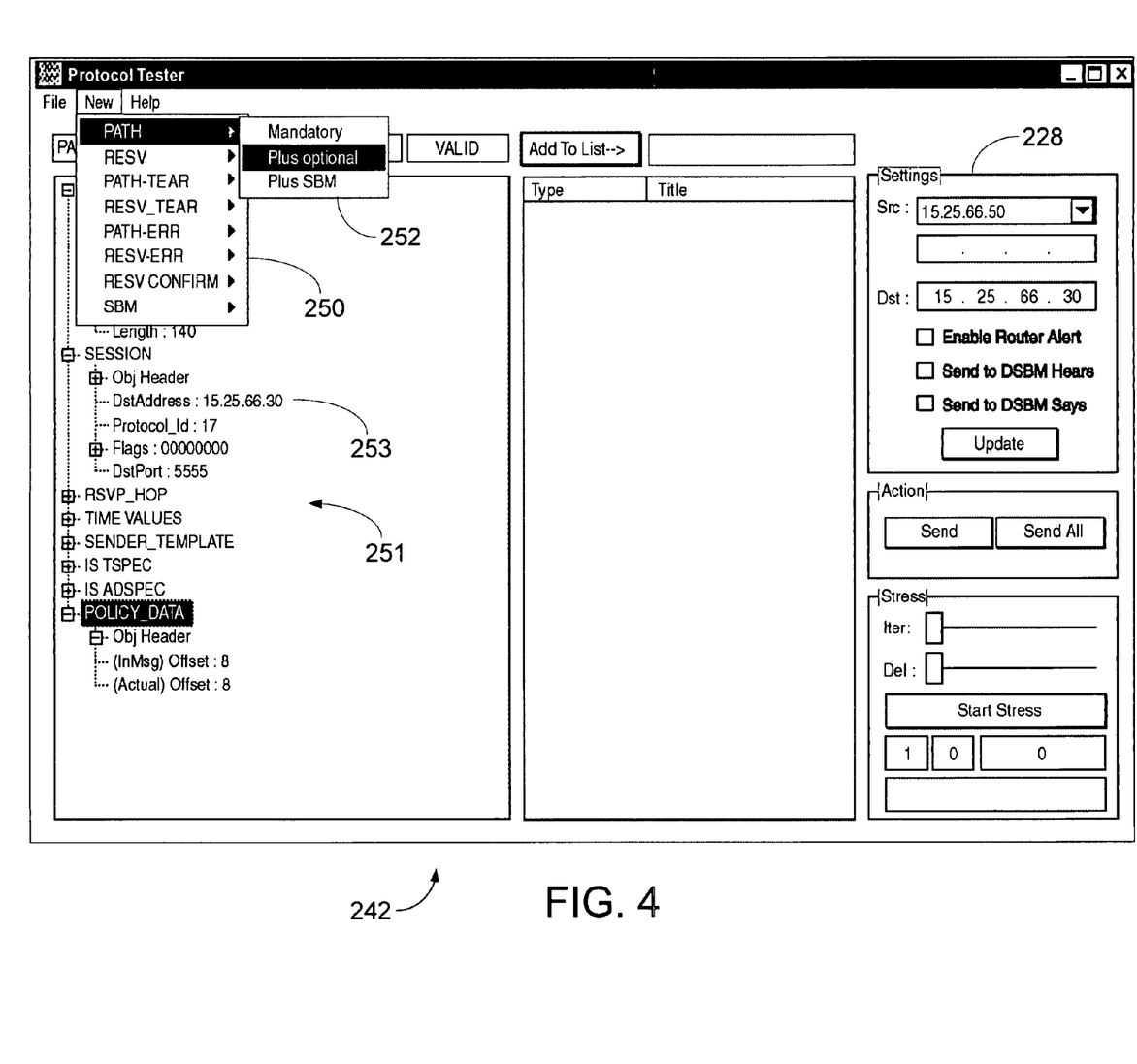

A user can specify the type of QOS message he wishes to create using a variety of user interface mechanisms, including typing the desired message type into an entry field or activating a pull-down menu. With reference to FIG. 4, a user can, for example, specify the type of QOS message he wishes to create by activating a pull-down menu 250 of the GUI 242. The user may also select the features he wishes to incorporate into the message through various sub-menus, such as the sub-menu 252. In FIG. 4, for example, the user has selected an RSVP PATH message that includes all of the optional data sections. The message tree 251 represents the selected type of PATH message. The initial default values that are assigned to the parameters of the PATH message are shown on the sub-branches of the tree 251. Some of these default values, such as the destination IP address 253, may be obtained from the settings entered by the user in the settings panel 228.

Figure 5:
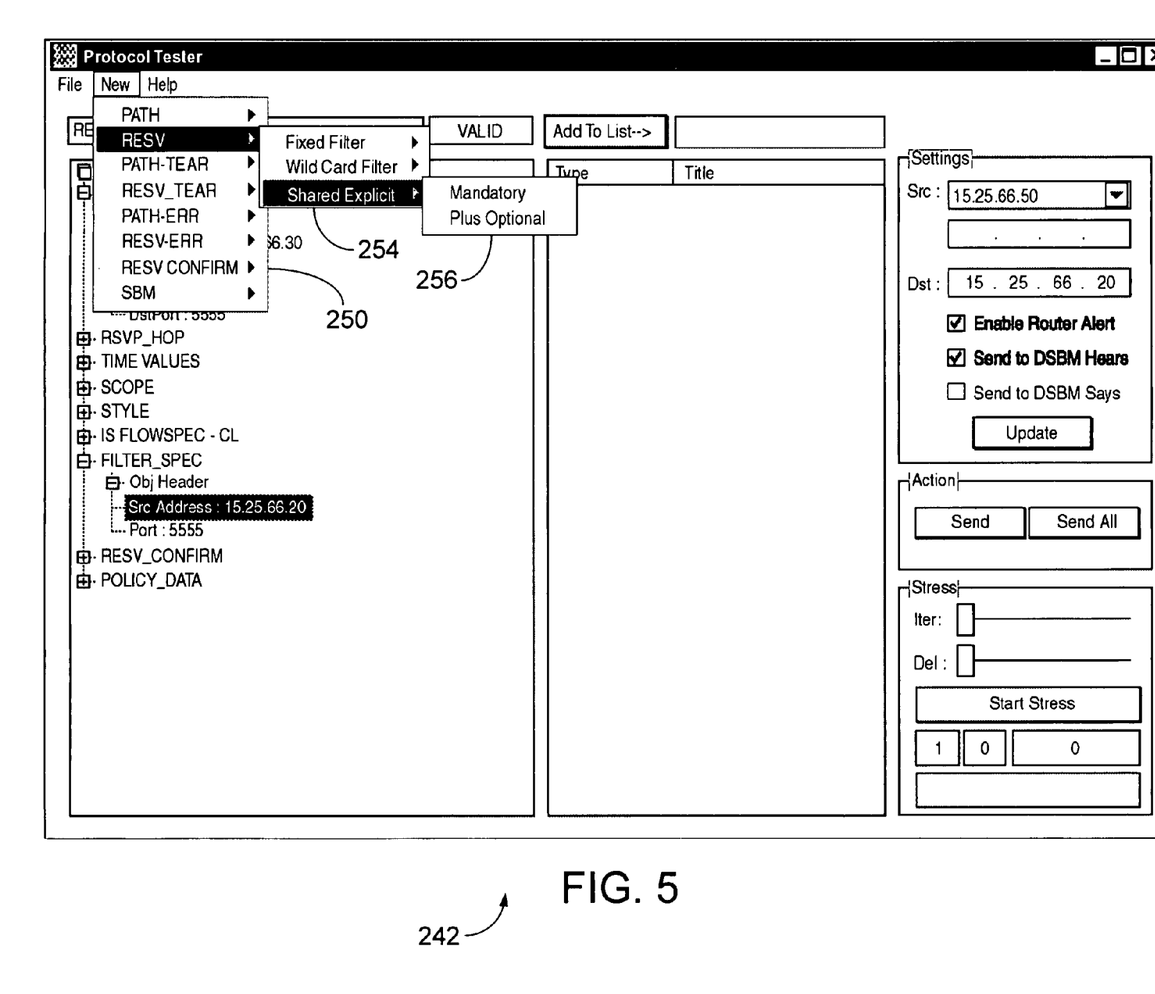

Referring to FIG. 5, another example sub-menu 254 of the menu 250 is shown. The sub-menu 254 lists features that relate to an RSVP RESV message. Specifically, the sub-menu 254 allows the user to choose which kind of filter he wants to include in the RSVP RESV message. In this case, the user has chosen a shared explicit filter and has activated a second sub-menu 256. The sub-menu 256 allows the user to choose whether or not he wants to include all of the optional data sections in the RESV message.

Figure 6:
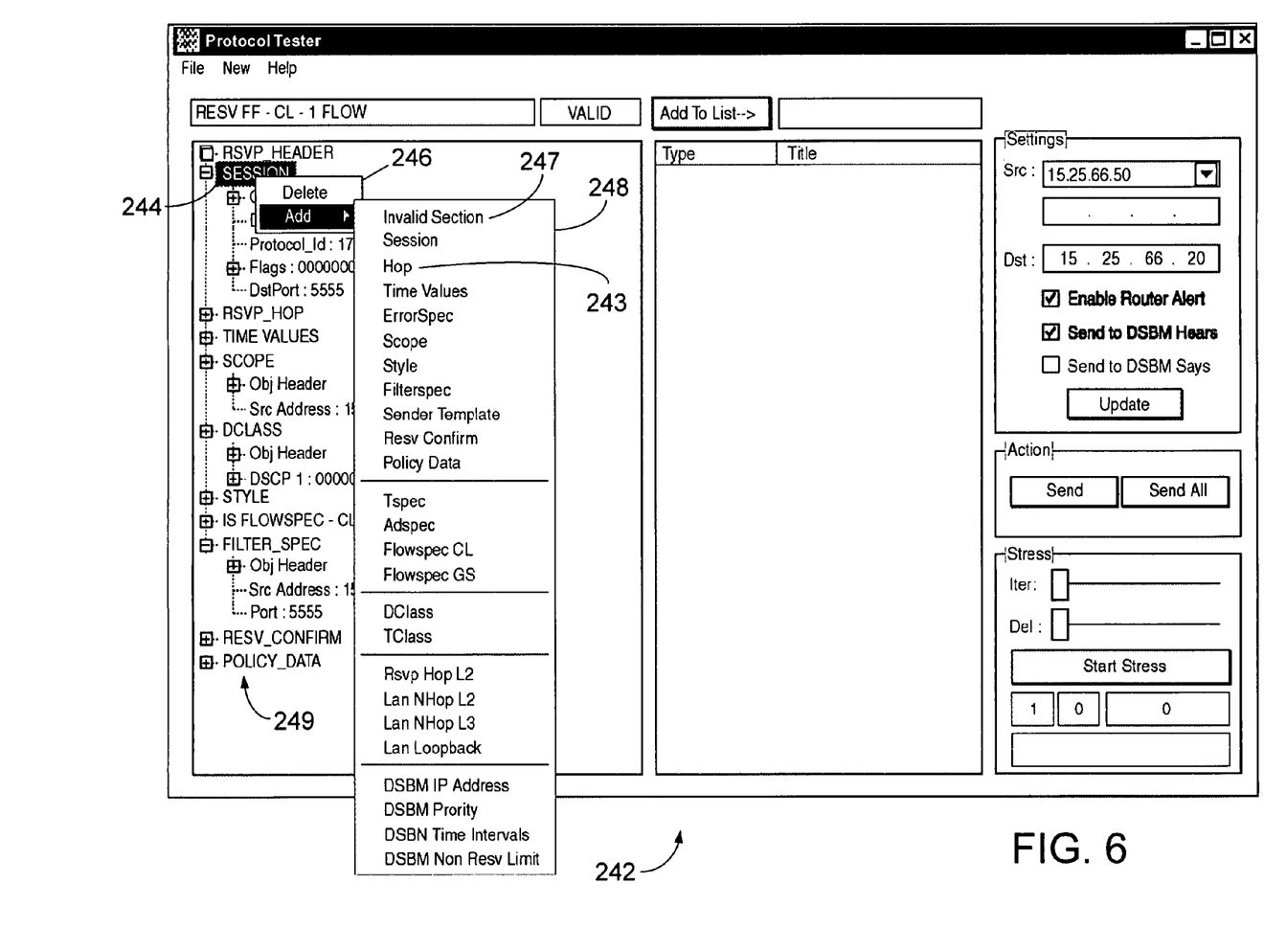

Turning to FIG. 6, an example of how the user adds a section to, or deletes a section from a QOS message—in this case, an RSVP RESV message—using the GUI 242 is shown. The user first selects an existing branch, such as the SESSION branch 244, of the message tree 249. The user then clicks the right mouse button to display a menu 246. The menu 246 gives the user the option of deleting the selected branch or of adding a new branch. If the user selects "Delete," the selected branch is deleted from the message tree 249, and the corresponding section (in this case the SESSION section) will not be included in the created RSVP message.

If the user selects "Add," then a second menu 248 having a list of all of the types of sections that may be added to the message is displayed. The user may then choose a type of data section from the second menu 248. In response to the user's choice, the test program adds a branch representing the added section of the selected type to the message tree 249 at a location immediately following the SESSION branch 244. When the RSVP message is created, a section of the type selected will be inserted just after the SESSION section.

Figure 9:
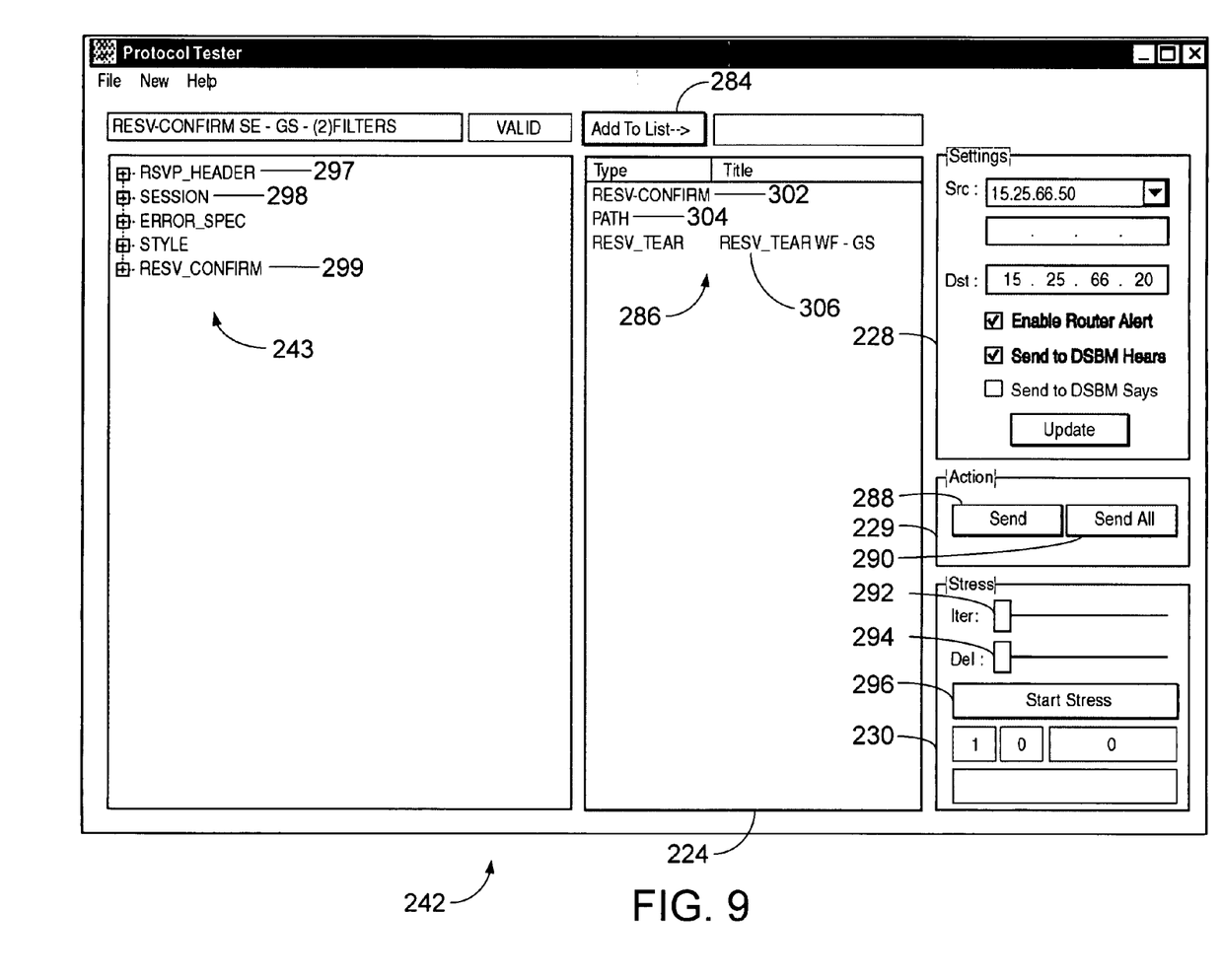

By deleting and adding sections as described above, a user may cause the test program to create a QOS message whose sections are ordered in a way that is inconsistent with the QOS protocol being used. Referring to FIG. 9, the user may, for example, add a second SESSION branch after RESV_CONFIRM branch 299. As a result, the message created by the test program would have two SESSION sections. Such a message would be invalid, since the RSVP specification allows only one SESSION section. In another example, the user may delete the SESSION branch 298 and replace it with a TSPEC branch. This would also render the message invalid, since RSVP requires a SESSION section in each RESV_CON- FIRM message, and does not allow a TSPEC section to be in a RESV_CONFIRM message.

Figure 7:
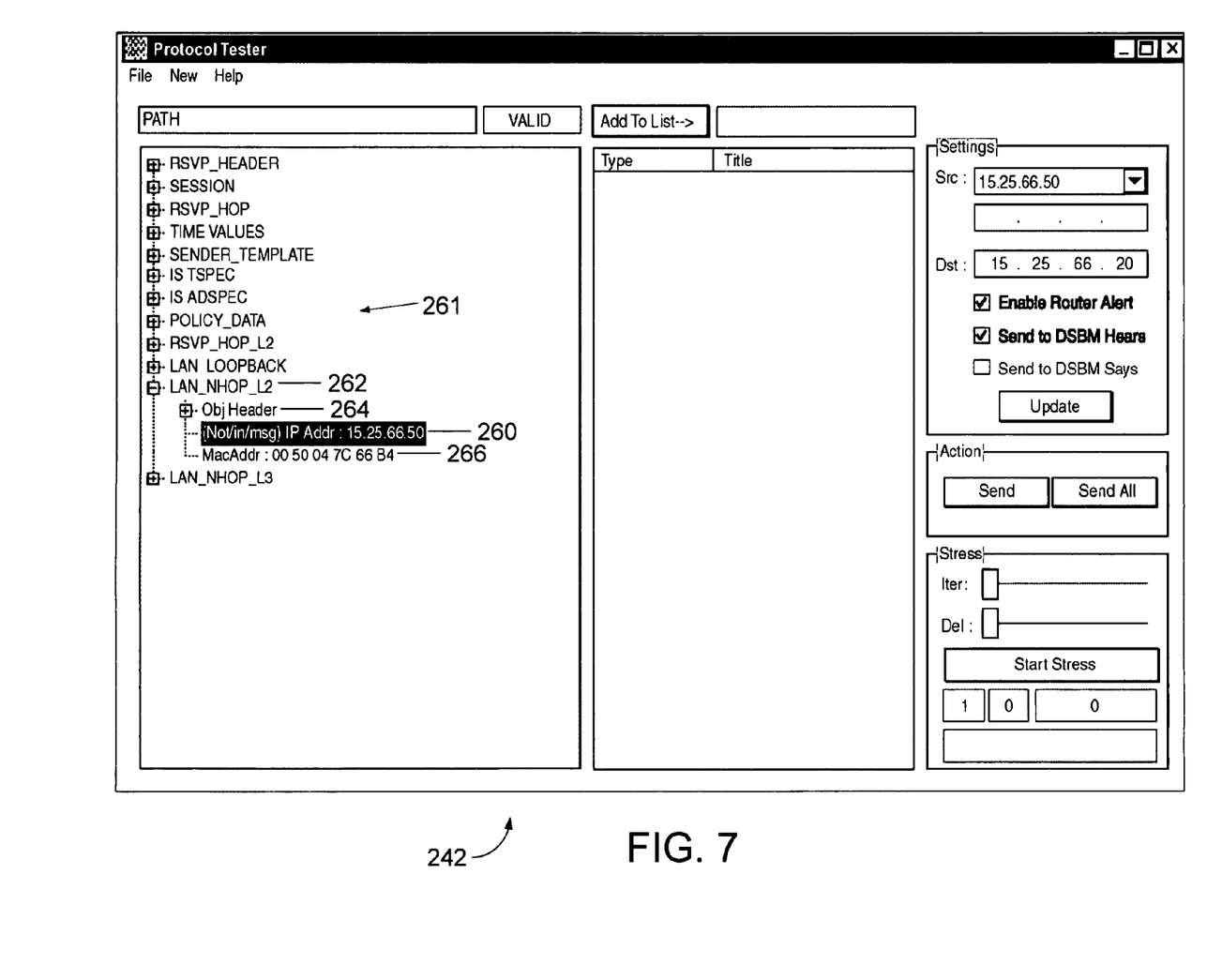
Figure 8:
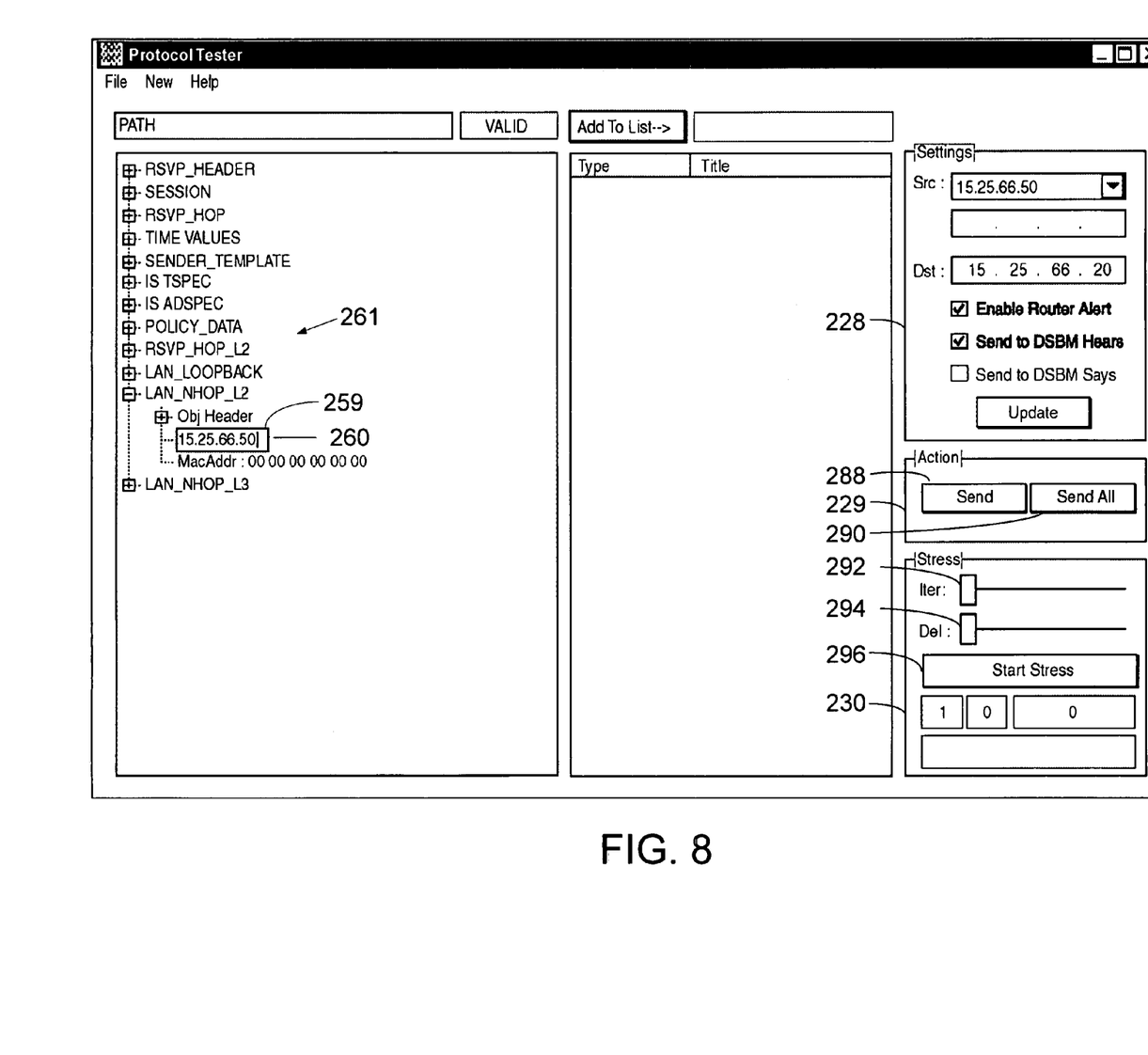

To edit a value of a parameter of the QOS message to be created, the user selects the representation of the parameter on the message representation and activates an editing interface. The editing interface displays the current value of the parameter and allows the user to edit, delete or overwrite the current value. Referring to FIGS. 7 and 8, the user may, for example, expand the branch representing the section in which the field for that parameter is located by clicking on the "+" sign next to the branch. The branch 262, representing the "LAN_NHOP_L2" data section of an RSVP PATH message, is shown as being expanded into sub-branches 264, 260 and 262, representing the object header parameter, the IP address parameter, and the MAC address parameter respectively. The user has selected the sub-branch 260. To edit a value of the IP address, the user double clicks the sub-branch 260 to activate the editing interface, shown here as an editing box 259. The user then edits the current value—15.25.66.50 in this case— in the editing box 259. The edited value will be inserted into the IP address field of the LAN_NHOP_L2 section of the created RSVP message.

The user may cause an invalid value to be inserted into a section of a QOS message using the above-described procedure as well. For example, the user can enter the value "0.0.0.0" into the edit box 259 of FIG. 8, causing the test program to create an RSVP PATH message with a value of "0.0.0.0" inserted into IP address field of the LAN_NHOP_L2 section. This would result in an invalid message being created. Similarly, the user may replace a mandatory value with a NULL value by expanding one of the branches of the tree, activating an editing box, and deleting the current value. Referring to the tree 256 of FIG. 3, the user may, for example, expand the SCOPE branch 210 and delete the contents of the scope list (not shown), so that the RESV message created by the test program contains a SCOPE section that has no scope values. Since the RSVP protocol specification requires that there be at least one scope value in the SCOPE section, the created RESV message would be invalid.

A user may also rely on the test program itself to create one or more invalid sections to be included in the created QOS message. Referring to FIG. 6, a user may, for example, choose the "Invalid Section" item 247 from the sub-menu 248 to add a branch (not shown) representing the invalid section to the message tree 249. Like any other branch, the invalid section branch may be expanded and edited. The user may, for example, edit the header field by expanding the invalid section branch and double clicking the header sub-branch. The user could then enter a value for the "section type" (normally called the "object type" in the context of the RSVP protocol) so as to make the invalid section appear to be a valid section. The test program will then include a section in the created message having a valid header and invalid data (e.g. all zeroes, NULL values, garbage values).

Figure 10:
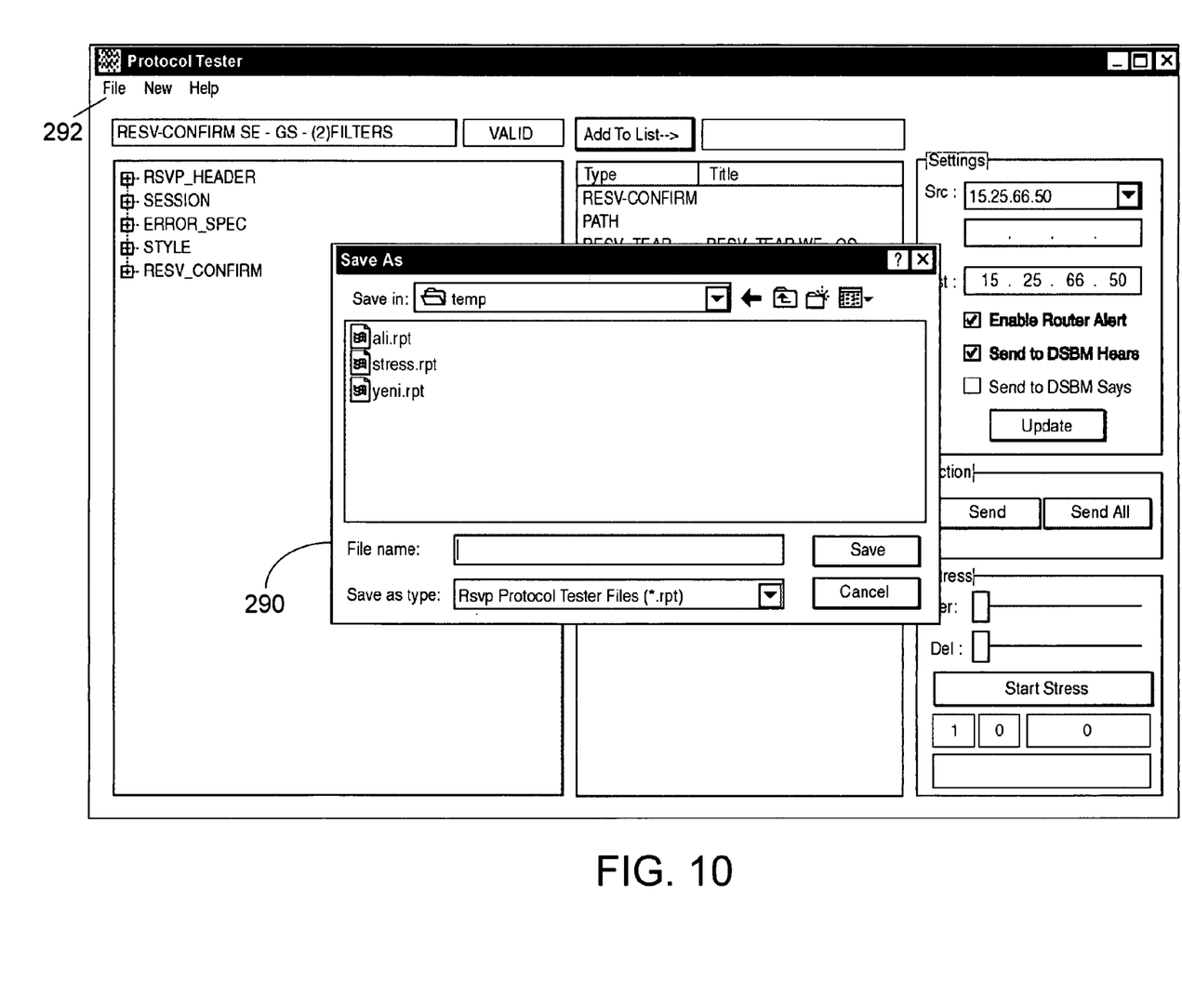

Once the user has made all of the desired edits, additions, and deletions to the message representation, he may add the represented message to the list section of the user interface. Referring to FIG. 9, the user may, for example, add the RESV-CONFIRM message represented by the message tree 243 to a list 286 in the list section 224 by activating an "Add to List" button 284. In this example, the list 286 includes two other RSVP messages 304 and 306 that are ready to be sent in addition to the RESV-CONFIRM message 302. The user saves the messages on the list 286 to a file using a dialog box 290 as shown in FIG. 10. The dialog box 290 is activated by pulling down a menu (not shown) from a "file" item 292. The user may save the list 286 under any suitable file name. The user may also import a list of saved messages from a file by using an "open" dialog box (not shown) that is also activated pulling down a menu from the "file" item 292.

After creating several QOS messages and adding them to the list, the user may choose to send one or more of those messages to the network. Referring to FIG. 9, the user may, for example, highlight the messages to be sent and activate a "send" button 288. The user may also activate the "send all" button 290 to cause all of the messages in the list 286 to be sent. Additionally, the user may subject a network to a stress test by using the controls of the stress panel 230. For example, the user can set the number of times the list 286 of messages is to be sent by moving the sliding control 292 to the desired number and setting the delay between each iteration by moving the sliding control 294 to the desired delay level. The user starts transmission of the list 286 for a stress test by activating the "start stress" button 296.

Figure 11:
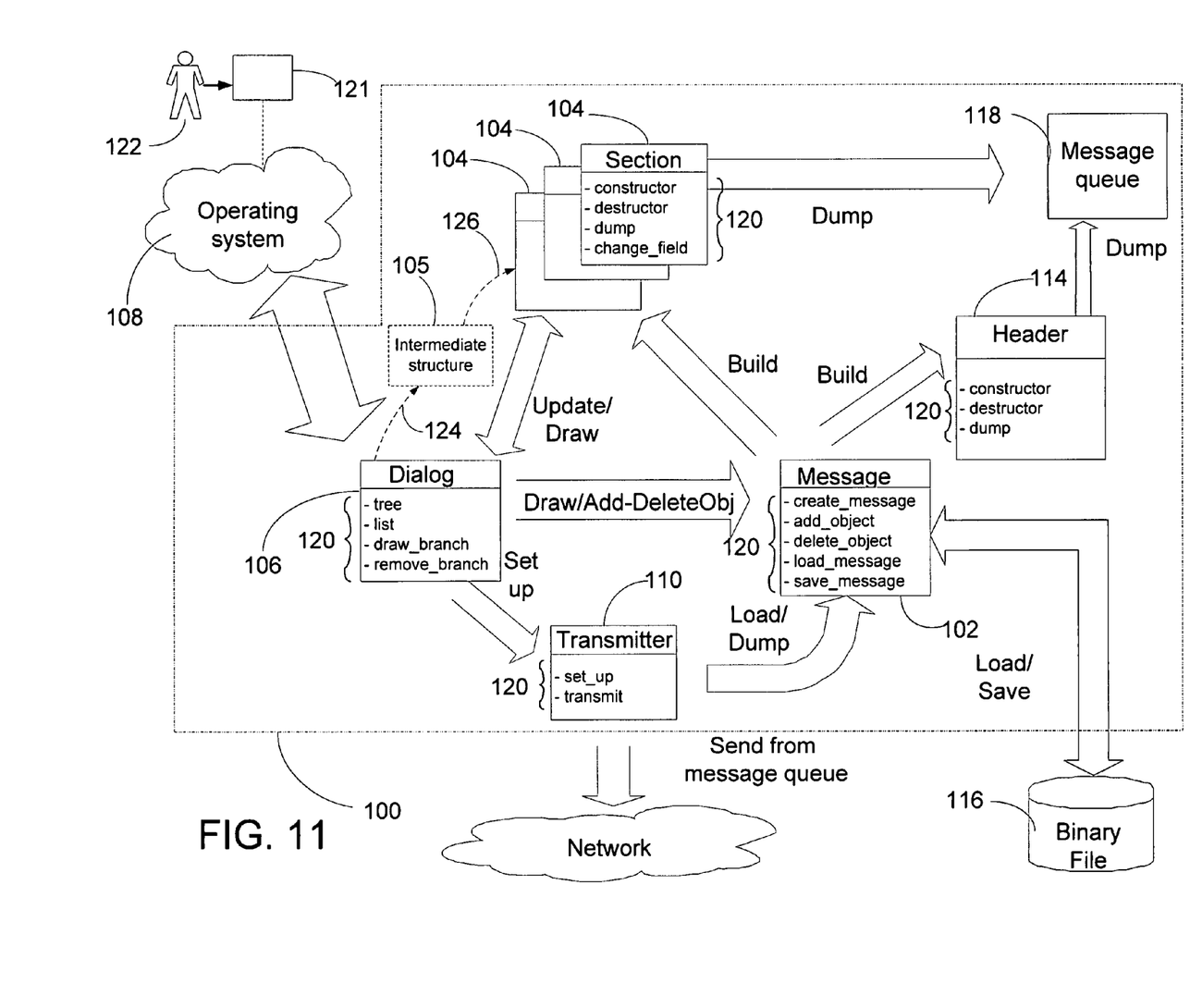
FIG. 11 illustrates the architecture of a preferred embodiment of the invention.

Turning now to FIG. 11, the components that comprise an exemplary embodiment of the test program are shown. The test program 100 is depicted as executing on a computer 121 having an operating system 108, and is implemented as a set of C++ objects 102-114 which are defined by a set of C++ classes. Each object includes one or more functions 120 for performing operations on data. Of course, the names, organization, and number of functions shown are meant only to be exemplary, and more complex sets of functions are possible.

Figure 12:
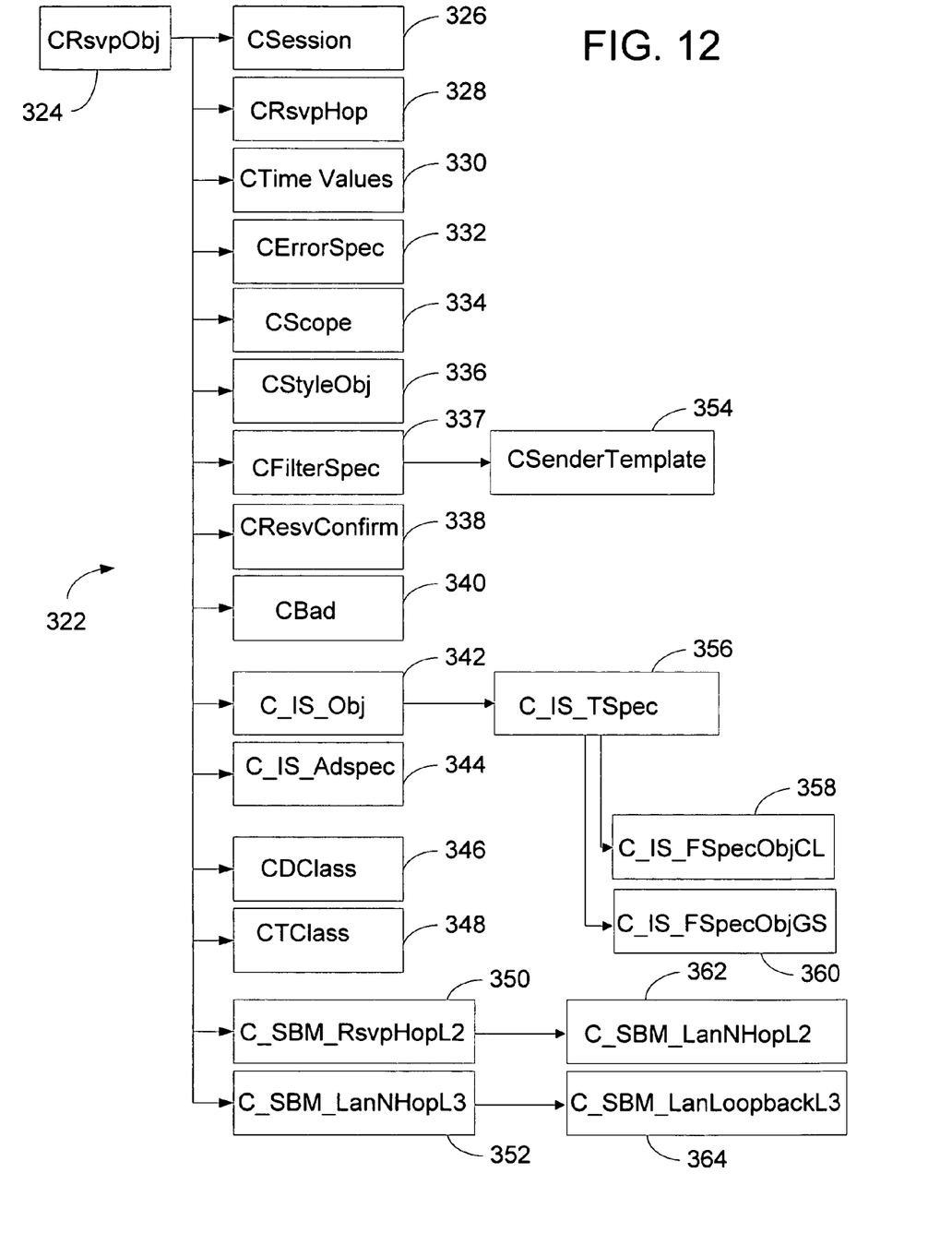
FIG. 12 illustrates an exemplary object-oriented class hierarchy that may be used in creating sections of a QOS message.

A message object 102 creates the overall framework of a QOS message by determining which sections belong in the message, and by causing a section object 104 to be created for each section. Each section object 104 holds the values for the parameters required to be in the corresponding section in the protocol message. There are many types of section objects 104, and each type is defined by its own class. Referring to FIG. 12, the test program 100 may have, for example, a family 322 of section classes. The initial prototype for a section object is a CRsvpObj class 324. Several child classes 326-352 and grand-child classes 354-364 inherit from CRsvpObj class 322. Each child and grand-child class defines a specific type of section object. For example, the Csession class 326 defines objects that hold the values for the parameters of the SESSION section of an RSVP message. Each section class definition also includes a constructor for creating and initializing a section object, and a destructor for destroying a section object.

By defining QOS messages as a set of C++ section objects, the exemplary embodiment of the test program 100 can be easily modified to account for changes in a QOS protocol specification and to account for the creation of new QOS protocols. For example, if a new RSVP specification is published in which the SESSION section of an RSVP message has been redefined, then a programmer could simply create a new version of the CSession class 326 (FIG. 12) and thereby update the test program with a minimum of effort.

Turning again to FIG. 11, a dialog object 106 cooperates with an operating system 108 of a computer 121 to enable a user 122 to interact with the test program 100. When the user 122 wishes to create a QOS message, the dialog object 106 receives the user's input and calls one or more functions of the message object 102. The message object 102 responds by causing the appropriate section object(s) 104 to be created for the message. The message object 102 also causes a header object 114 to be created for the QOS message. The header object 114 holds the values of the parameters required for the QOS message header. When the user 122 wishes to enter data into a section of a QOS message during the message customization process, the dialog object 102 and the appropriate section object 104 cooperate to carry out the desired changes.

A transmitter object 108 communicates with the message object 102 to control the transmission of each message to the network in response to user input for the dialog object 106.

During its operation, a user 122 interacts with the testing program 100 using one or more conventional input devices of the computer 121. The operating system 108 detects the input of the user 122 and notifies the dialog object 106 of the input. When the user 122 chooses a type of QOS message to be created—for example, an RSVP PATH message, the tree function and list function of the dialog object 106 are invoked and interact with the operating system 108 to create a message tree on the display of the computer 121. The message tree has the appropriate list of sections for the type of QOS message selected by the user 122, and will thereby represent the QOS message to be created by the test program 100. The dialog object 106 then invokes the create_message function of the message object 102 and passes the user's selection thereto. The create_message function determines which sections are required to be in the selected message type. The message object 102 calls the constructor of each section class required to create the section object 104 for each section. Each created section object 104 calls the draw_branch function of the dialog object 106, causing the dialog object 106 to cooperate with the operating system 108 to draw a branch representing the corresponding section on the message tree.

If the user 122 chooses to add a section to the message represented by the message tree, the dialog object 106 receives notification of the selection from the operating system 108 and invokes the add_object function of the message object 102 and informs the add_object function as to which type of section the user wishes to add. The add_object function calls the constructor of the appropriate section class to create a section object for the section type to be added. For example, if the user selected the "Hop" item 243 from the sub-menu 248 (FIG. 6), the add_object function will call the constructor of the CRsvpHop class 308 (FIG. 12). This causes a section object 104 to be created as an instance of the CRsvpHop class 308. The newly created section object 104 then calls the draw_branch function of the dialog object 106. The draw_branch function interacts with the operating system 108 to cause a branch representing the hop section to be drawn on the display.

If the user 122 chooses to delete a section from the message represented by the message tree, the dialog object 106 receives notification of the selection from the operating system 108 and invokes the delete_object function of the message object 102 and informs the delete_object function as to which section the user wishes to delete. The delete_object function calls the destructor of the appropriate section object 104 to delete the section object 104. For example, if the user selected SESSION branch 246 of the message tree 249 (FIG. 6), the delete_object function calls the destructor of the section object 104 (which is, in this case, an instance of the CSession class 306 of FIG. 12) for that section. The destructor invokes the remove_branch function of the dialog object 106 to have the branch deleted from the display. The destructor then destroys the SESSION section object 104.

When the user 122 chooses to edit the current value of a parameter in a section of the message represented by the message tree, the dialog object 106 receives notification of the edit from the operating system 108 via the tree function and references a invokes the change_field function of the appropriate section object 104, informing the function as to the edited value. The change_field function then changes the value of the parameter within the section object 104. When implemented on one of the MICROSOFT WINDOWS family of operating systems, the Tree function is preferably the Tree control of the MICROSOFT FOUNDATION CLASS (MFC). The MFC Tree control provides a 64-bit block—a double-word—per branch in which to store values associated with the branch. Rather than storing the actual value associated with a branch, this double-word is preferably used to store a first pointer 124 to an intermediate structure 105—shown in dashed lines. The intermediate structure 105 contains a second pointer 126 to the section object 104 that holds the values for the parameters that the user wishes to change. Thus, the dialog object 106 references the first and second pointers 124 and 126 to locate and invoke the change_value function of the section object 104.

When the transmitter object 110 receives notification from the dialog object 106 that the user wishes to transmit one or more saved messages, the transmitter object 108 calls a load_message function of the message object 102. In response to the load_message function call, the message object 102 loads the stored message or messages from a binary file 116. For each message being sent, the message object 102 causes all of the section objects 104 that belong to the message to dump themselves to a message queue 110. This is preferably accomplished by calling the dump function of each of the section objects 104. The message object 102 also calls a constructor of a QOS header class to create a QOS header object 114. The QOS header object 114 contains the data required for the QOS message header. The transmitter object 110 sends each of the messages in the message queue 108 to the network at a frequency and period specified by the user.

In view of the many possible embodiments to which the principals of this invention may be applied, it should be recognized that the embodiments described herein with respect to the drawing figures is meant to be illustrative only and should not be taken as limiting the scope of the invention. It should also be recognized that the various steps involved in carrying out the methods described above as well as the specific implementation of each step described above may be changed in ways that will be apparent to those of skill in the art.

Finally, those of skill in the art will recognize that the elements of the illustrated embodiment shown in software may be implemented in hardware and vice versa, and that the illustrated embodiment can be modified in arrangement and detail without departing from the spirit of the invention. Therefore, the invention as described herein contemplates all such embodiments as may come within the scope of the following claims and equivalents thereof.

We claim:

1. A method for creating a quality of service message having one or more sections, the method comprising:
    displaying a representation of the quality of service message;
    responsive to a user input, adding a representation of an invalid section to the representation of the quality of service message;
    creating the quality of service message from the representation of the quality of service message wherein the quality of service message includes the invalid section created from the representation of the invalid section; and
    responsive to a user input, sending the quality of service message to a network device to test the ability of the network device to respond to the quality of service message wherein the quality of service message includes the invalid section.

2. The method of claim 1, wherein computer-executable instructions for performing the steps of the method are stored on a computer-readable medium.

3. The method of claim 1, wherein the invalid section comprises a valid section header and a body, the body comprising invalid data.

4. The method of claim 1, further comprising adding the quality of service message to a list of a plurality of quality of service messages.

5. The method of claim 4, further comprising, responsive to a user input, sending the plurality of quality of service messages to a network device to test the ability of the network device to respond to the plurality of quality of service messages including the invalid section.

6. The method of claim 5, further comprising, responsive to a user input, setting a count specifying the number of times the plurality of quality of service messages is sent to the network device.

7. The method of claim 6, further comprising, responsive to a user input, setting a delay time specifying the amount of time to delay between each sending of the plurality of quality of service messages to the network device.

8. The method of claim 1, wherein the representation of the quality of service message comprises a tree view including a branch for each section of the quality of service message.

9. A computer-readable medium having computer-executable instructions stored thereon that, when executed by a processor, create a data structure comprising a plurality of classes, each class defining a type of section to be included in a quality of service message, the plurality of classes including at least one invalid section class wherein the quality of service message is created by the processor and sent to a network device to test the ability of the network device to respond to the quality of service message wherein the quality of service message includes an invalid section based on the invalid section class.

10. The computer-readable medium of claim 9, wherein each of the plurality of classes inherits from a single parent class.

11. The computer-readable medium of claim 9, wherein each class defines a type of section for inclusion in a Resource Reservation Protocol message and the at least one invalid section class defines an invalid Resource Reservation Protocol section.

12. A method for allowing a user to set up a quality of service message, the method comprising:
 displaying a user interface through which the user can specify a quality of service message type;
 displaying in the user interface a representation of a quality of service message of the quality of service message type; and
 displaying in the user interface a selection means for allowing the user to select at least one option for the quality of service message type; and
 displaying in the user interface the representation of the quality of service message according to the selected option.

13. The method of claim 12, wherein computer-executable instructions for performing the steps of the method are stored on a computer-readable medium.

\* \* \* \* \*